US011131604B2

(12) United States Patent
Krogmann

(10) Patent No.: US 11,131,604 B2
(45) Date of Patent: Sep. 28, 2021

(54) TURBOCHARGER SPEED SENSOR DIAGNOSTIC TOOL AND METHOD

(71) Applicant: Caterpillar Inc., Deerfield, IL (US)

(72) Inventor: Paul Krogmann, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 290 days.

(21) Appl. No.: 16/281,570

(22) Filed: Feb. 21, 2019

(65) Prior Publication Data

US 2020/0271049 A1 Aug. 27, 2020

(51) Int. Cl.
*F02D 41/22* (2006.01)
*G01M 15/04* (2006.01)
*F02B 39/16* (2006.01)
*F02D 41/00* (2006.01)

(52) U.S. Cl.
CPC ............ *G01M 15/04* (2013.01); *F02B 39/16* (2013.01); *F02D 41/0007* (2013.01); *F02D 41/22* (2013.01)

(58) Field of Classification Search
CPC ........... F02D 41/222; F02D 2041/2086; F02D 41/2474; G01R 31/2829; G01M 15/04
See application file for complete search history.

(56) References Cited

U.S. PATENT DOCUMENTS 4,334,427 A 6/1982 Armstrong
5,721,657 A * 2/1998 Griffiths ............ H02J 13/00009
361/93.1
7,937,996 B2 5/2011 He et al.
9,581,611 B2 2/2017 Eichel
2012/0173076 A1* 7/2012 Anderson ............ F02D 41/221
701/34.4

FOREIGN PATENT DOCUMENTS

CN 101833012 B 5/2012
CN 206920468 * 1/2018 ............ G01P 21/02
CN 206945736 * 1/2018 ............ G01P 21/02
JP 2011-241733 A 12/2011

OTHER PUBLICATIONS

Prikhodko, Operation of MEMS Coriolis Vibratory Gyroscopes, 2016 (Year: 2016).*

* cited by examiner

*Primary Examiner* — Eric S. McCall
*Assistant Examiner* — Timothy P Graves
(74) *Attorney, Agent, or Firm* — Bookoff McAndrews

(57) ABSTRACT

A tester tool for a sensor and related method includes connecting the sensor to the tester tool, activating the tester tool to operate the sensor, and testing the sensor. The tester tool includes a power supply, a control module, a display module and a connector plug adapted for releasable connection with a sensor connector plug, the connector plug being connected to the power supply for receiving power to operate the sensor, and to the control module for providing information to the control module from the sensor. The display module provides information to a user indicative of operation of the sensor when the sensor is active and receives power to operate from the power supply.

20 Claims, 4 Drawing Sheets

TURBOCHARGER SPEED SENSOR DIAGNOSTIC TOOL AND METHOD

TECHNICAL FIELD

This patent disclosure relates generally to inspection systems and, more particularly, to diagnostic tools and methods for diagnosing failures in sensors for use on internal combustion engines.

BACKGROUND

Internal combustion engines are generally complicated machines that include numerous components and systems. Modern engines are sometimes even more complicated than older engines in that they include various sensors and actuators in addition to the main engine operating components. In modern engines, various sensors may be used to monitor operating parameters of the engine, and provide signals to a controller that monitors and controls engine operation. Such sensors are typically powered by electrical power provided through the engine's electrical system, and similarly provide electronic signals to the electronic controller. The power delivery to the sensors, and also the communication of signals from the sensors are carried on electrical cables or wires.

As is often the case, when a failure occurs on an engine component, a service technician may first attempt to diagnose the failure to determine which engine component requires replacement or repair. Sensors on the engine, and the signals they provide, may help diagnose failures in engine components. For example, a boost pressure sensor may be used to diagnose an air compressor that is underperforming. However, in instances when the sensor itself is malfunctioning and provides inaccurate signals, then it becomes more difficult to determine whether there is a fault in the sensor or in the component that affects an engine parameter that the sensor is monitoring.

To aid technicians in diagnosing engine failures, handheld tools that can determine an operational state of an engine component can be used. One example of such a diagnostic or engine service tool can be found in U.S. Pat. No. 9,581,611 to Eikel, which describes a system and method for detecting a rotational speed of a turbocharger. In Eikel, a system includes a sensor that emits radar waves that are reflected off a rotating machine structure such as a turbine or compressor wheel. Signals from the sensor are provided to a display, which provides an indication of the turbocharger speed. The system of Eikel is at least partially effective in determining whether a turbocharger is operating, but is unable to verify whether a turbocharger speed sensor, which may be installed on the turbocharger is operating. Moreover, since engine sensors provide signals directly to an engine controller, it is often very difficult or impossible to access the information provided by the sensor and, thus, even when using a device like the one described in Eikel, it is difficult or impossible to correlate or verify the information provided by the display of Eikel with information provided the engine's sensor.

SUMMARY

The disclosure describes, in one aspect, a tester tool for a sensor. The tester tool includes a housing, a power supply disposed in the housing, a control module disposed in the housing and operably associated with the power supply, wherein the control module uses electrical power stored in the power supply to operate, and a display module disposed in the housing, the display module arranged to receive information from the control module and to display information on at least one display readout that is disposed on the housing and is visible externally from the housing. A connector plug is adapted for releasable connection with a sensor connector plug, the connector plug being connected to the power supply for receiving power to operate the sensor, and to the control module for providing information to the control module from the sensor, wherein the at least one display readout is configured to provide information to a user indicative of operation of the sensor when the sensor is active and receives power to operate from the power supply.

In another aspect, the disclosure describes a method for testing sensor functionality for a sensor used to sense a speed of a compressor wheel and produce a signal indicative of a rotational speed of the compressor wheel, the compressor wheel being operational within a compressor of a turbocharger on an engine. The method includes preparing a sensor to be tested, connecting a sensor connector to a mating connector plug of a tester tool, activating the tester tool to operate the sensor, testing sensor operation using the tester tool, and concluding a test of the sensor.

In yet another aspect, the disclosure describes a method for diagnosing a failure in a sensor for measuring a shaft speed of a turbocharger. The method includes providing the sensor installed into the turbocharger, connecting a sensor connector to a mating connector plug of a tester tool, activating the tester tool to operate the sensor, testing sensor operation using the tester tool, and concluding a test of the sensor.

DETAILED DESCRIPTION

Sometimes during operation, engine components may experience failure. In modern engines, such failures can sometimes be diagnosed by an electronic controller associated with the engine, which receives signals from various sensors monitoring engine operating parameters. In a typical installation, for example, relating to a turbocharger installed on an engine, the controller may receive a signal from a turbocharger speed sensor, and monitor or analyze the signal to infer a turbocharger shaft speed. In one exemplary embodiment, the sensor may be a variable reluctance (VR) or magnetic sensor, which senses the proximity of metal or a changing magnetic field associated with a compressor wheel. The signal provided to the controller is carried through electrical conductors in analog or digital form and is analyzed for its various parameters such as frequency, amplitude and the like. Based on this information, the controller may determine or otherwise calculate a rotational speed of the compressor wheel and, thus, a rotational speed of a turbocharger shaft. A segmented schematic view of a turbocharger 100 the embodies some of these exemplary features is shown in FIG. 1.

Figure 1:
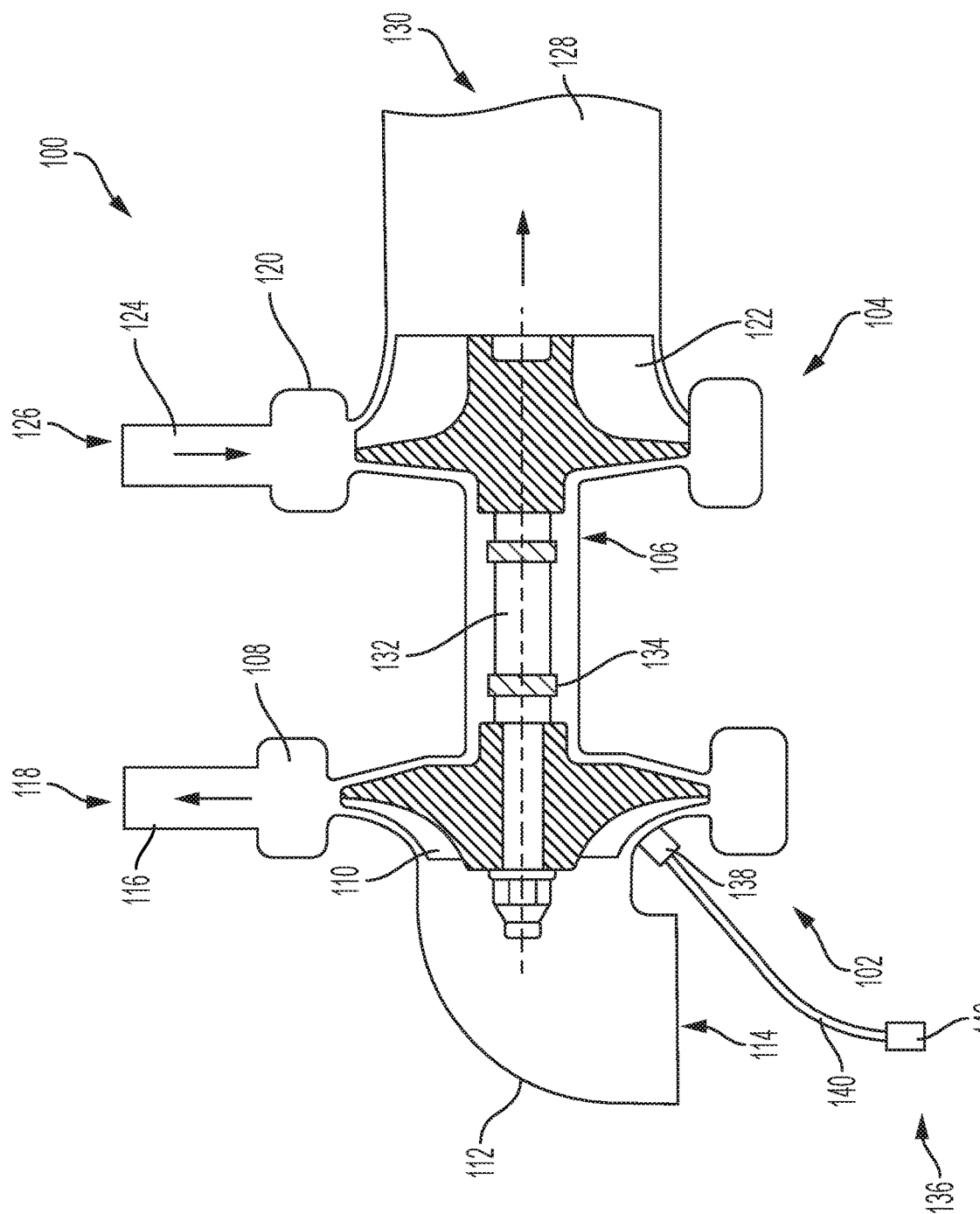
FIG. 1 is a schematic view in cross section of a turbocharger having a speed sensor in accordance with the disclosure.

In reference to FIG. 1, the turbocharger 100 includes a turbine 104 and a compressor 102 connected to one another through a center housing 106. The compressor 102 includes a housing 108 that encloses a compressor wheel 110. The housing 108 forms a scrolled housing of decreasing area such that air (or a mixture of air with other gases such as exhaust gas and/or fuel) provided to an inlet conduit 112 through an inlet opening 114 is radially redirected by the rotating compressor wheel 110 and compressed. The compressed air (or mixture containing air) is provided through an outlet conduit 116 to an outlet opening 118. In the known fashion, the compressed air or mixture at the outlet opening 118 may be provided to one or more engine cylinders to operate the engine.

The turbine 104 has a similar construction insofar as the turbine 104 includes a housing 120 that encloses a turbine wheel 122. The turbine housing 120 forms a scrolled housing of increasing area such that exhaust gas provided to an inlet conduit 124 through an inlet opening 126 is radially redirected towards the turbine wheel 122, causing it to rotate. Exhaust gas that has passed over and/or through the turbine wheel 122 is provided through an outlet conduit 128 to an outlet opening 130. In the known fashion, the turbine wheel 122 is connected to a turbocharger shaft 132, which extends through the center housing 106 and which is also connected to the compressor wheel 110. Bearings 134 facilitate rotation of the turbocharger shaft 132 relative to the center housing 106.

In the illustrated embodiment, the turbocharger 100 includes a speed sensor 136. As shown, the speed sensor 136 includes a sensing element 138 having electrical conduits 140 extending therefrom and connected to a connector 142. In the usual fashion, the conduits 140 include conductors providing electrical power to operate the sensing element 138 as well as conductors that carry a reading or sensed signal. The connector 142, which may alternatively be mounted directly onto the sensing element 138, provides an electrical interface to an engine harness (not shown) such that the various electrical conductors the sensing element 138 is connected to provide the necessary power and carry the sensor signal to the controller monitoring the signal.

While the sensor 136 and engine onto which the turbocharger 100 is installed are operating normally, the sensing element 138 provides a signal to a controller (not shown), which controller processes the signal and evaluates whether a turbocharger shaft speed inferred by the signal is within acceptable or expected limits. When, for example, the controller determines that the speed is zero when the engine is operating, or outside the acceptable limits, the controller may determine a fault condition to be present and notify the user of the engine that a fault with the turbocharger sensor is present. In the normal course, the turbocharger may be removed from the engine and replaced with a new one. The removed turbocharger may then be returned to the manufacturer for service and for a determination of the type of failure so the unit may be repaired.

Based on historical data, it has been determined that a majority of returned turbochargers at the manufacturer are operating normally. This occurs because the interpretation of a turbocharger or sensor fault by the controller on the engine is based on the signal of the sensor 136, which can be affected by a number of factors including faults in the wiring on either side of the connector 142, and others. In the past, a diagnosis of the source and location of the fault has not been possible because there is no access to the sensor signals from the sensor 136 during engine operation externally to the controller for a determination of where the fault may lie without adding considerable complexity to the diagnosis.

To address this issue, the present disclosure describes a system and method for determining an operating condition of a turbocharger speed sensor using a hand-held, autonomous tool that can both power the sensor and also process sensor signals in a portable device. The portable device can use used while the turbocharger is still on the engine to confirm the operational status of the sensor and its connector such that a detected fault can be confirmed or isolated from the sensor itself without incurring the complexity and cost of removing the turbocharger from the engine. The tool can also be used in other applications to verify sensor operation, for example, on newly build engines, on engines being tested, and others.

In one embodiment, the speed sensor tester is designed to power the speed sensor circuitry and display the speed the sensor is picking up in Hertz. The tester tool can be powered by an onboard power supply configured to provide an appropriate voltage, e.g. 12V or 24V, to power the sensor. The voltage supplied to the sensor may also be monitored by a display on the tester tool to ensure that the functional tests of sensors are performed under appropriate conditions. The signal output of the sensor is a square wave that provides a positive value when metal is proximal to the sensor, and a zero value when there is no metal proximal the sensor. When blades of a compressor wheel are sensed by the sensor, the square wave results when successive blades pass by the sensor as the wheel is rotating. Thus, a frequency of the square wave depends on the rotational speed of the compressor wheel.

Figure 2:
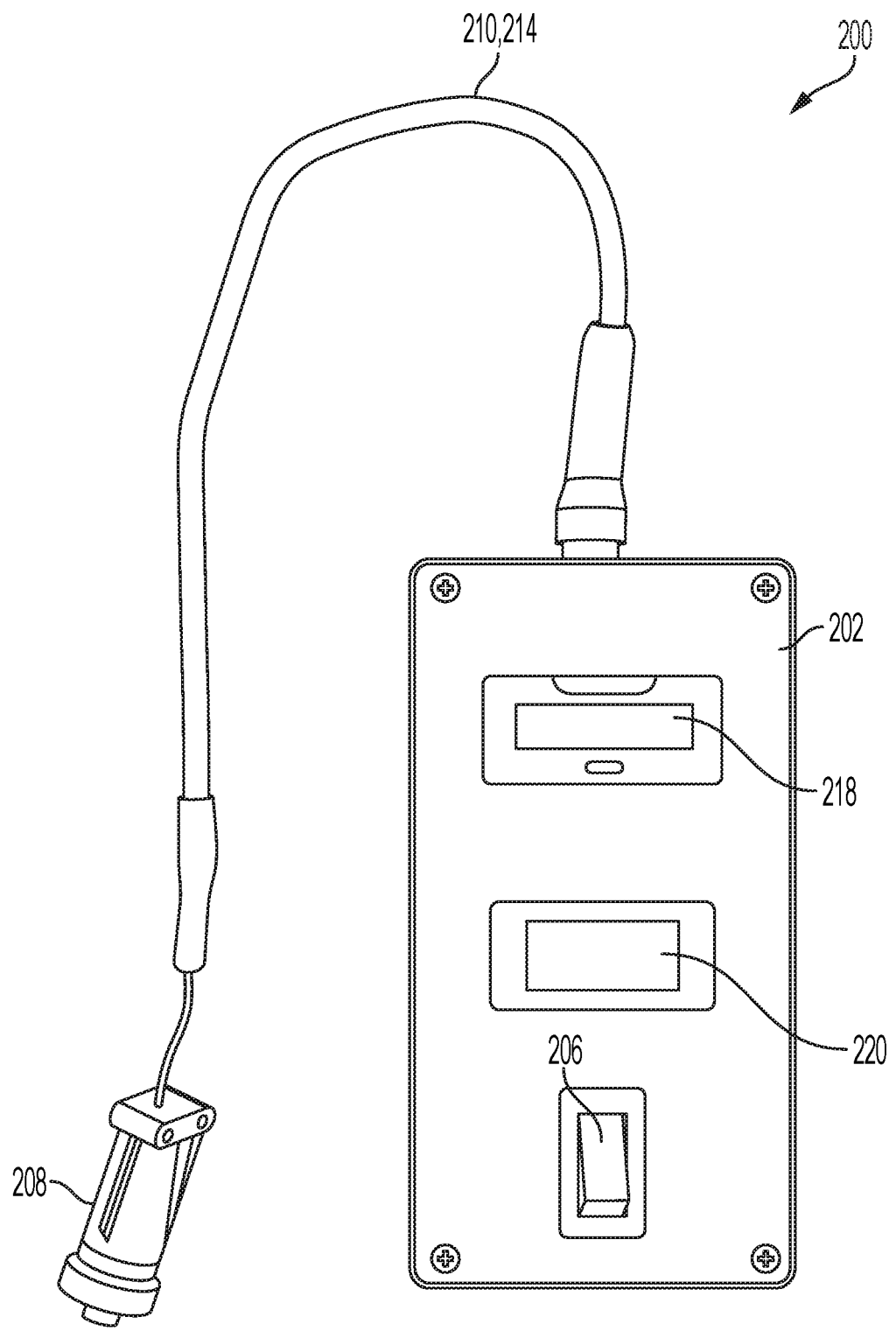
FIG. 2 is an outline view of a sensor testing tool in accordance with the disclosure.
Figure 3:
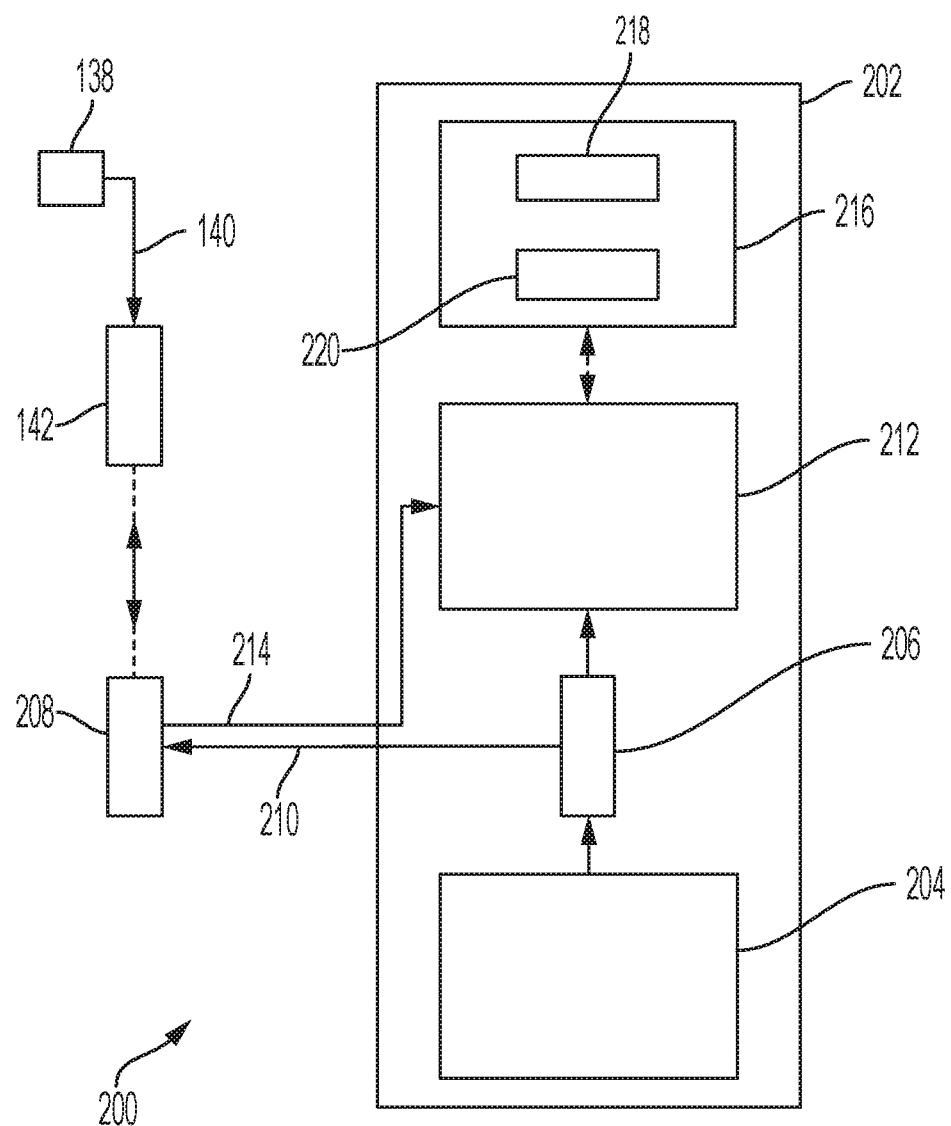
FIG. 3 is a block diagram for a sensor testing tool in accordance with the disclosure.

An outline view of one embodiment for a tester tool 200 is shown in FIG. 2. In the illustrated embodiment, various components and systems of the tester tool 200 are enclosed within a housing 202. As shown in FIG. 3, in which certain components and systems of the tester tool 200 are shown schematically, the housing 202 encloses a power supply such as a battery 204. The battery 204 is connected to a switch 206 that is arranged to, when activated, selectively provide electrical power to operate both internal systems of the tester tool 200 and also, externally, a sensor 136 (FIG. 1) to be tested. In the arrangement shown here, the switch 206 if connected to a first connector plug 208 via a set of electrical conduits 210. The switch 206 is also connected to a control module 212, which may be embodied as an integrated circuit containing various functions and structures. The control module 212, for example, can contain power relays, programmable functions and the like.

When in use, the first connector plug 208 is releasably connected or mated with a second connector plug, which can be the connector 142 of the sensor 136 (FIG. 1). Power provided to the sensing element 138 through the conduits 210 activates the sensor 136 for operation and for generating signals provided back to the control module 212 through signal conduits 214. The signals provided may be, for example, a square wave generated as the compressor wheel blades pass by the sensing element 138 while the compressor wheel is rotating. The control module 212 may process the signals provided through the conduits to determine various parameters such as the frequency of the square wave, which is indicative of the rotation speed of the wheel, the voltage provided to the sensor, and the like. The control module may further perform calculations. For example, when the number of blades on the compressor wheel are known, the control module 212 may be programmed to count the square wave pulses that make up a full revolution of the compressor wheel, and then count the full revolutions per second to calculate a rotational speed, in Hertz, of the compressor wheel. The information concerning operation of the sensor such as the parameters calculated or otherwise determined from the sensor signal, and also the operational voltage of the sensor, are provided from the control module 212 to a display interface 216.

The display interface 216 may include any appropriate visual, audible, or informational interfaces that provide information to user. In the illustrated embodiment, the display interface 216 includes a first display 218 (FIG. 2) that displays the rotational speed of the compressor wheel, in Hertz, and a second display 220, which displays the activation voltage provided to the sensor. During use, the rotational speed of the compressor wheel can be used to determine whether the sensor is functional, i.e., provides different signals for different rotational speeds of the compressor wheel. The activation voltage for the sensor can be used to ensure that a proper electrical circuit exists through the sensor to diagnose fault or short-circuit conditions with the sensor and/or its electrical conduits 140.

INDUSTRIAL APPLICABILITY

The present disclosure is applicable to on-engine, non-destructive tests for sensors such as a compressor wheel speed sensor. The testing is carried out by an autonomous, hand-held tester tool that can connect directly onto the sensor. The tester tool is configured to provide power to operate the sensor and includes electronics that can decipher sensor signals to provide to a user an indication of whether the sensor is operating correctly.

Figure 4:
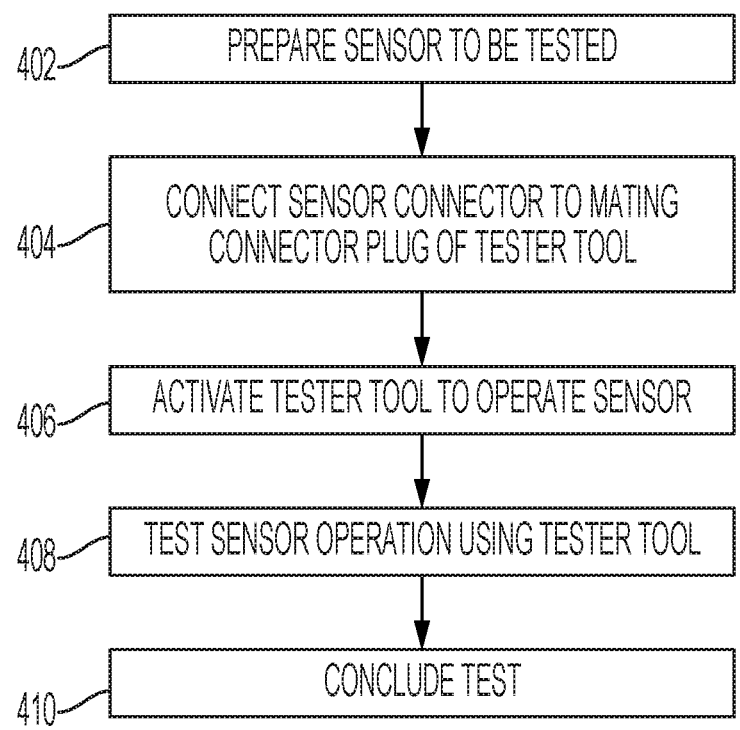
FIG. 4 is a flowchart for a method of testing a sensor in accordance with the disclosure.

A flowchart for a sensor functionality test using a tester tool in accordance with the disclosure is shown in FIG. 4. The testing method includes preparing the sensor to be tested at 402. For example, if the sensor is still installed on a turbocharger mounted on an engine, the preparing step at 402 includes disconnecting a sensor to be tested from existing engine wiring, an engine harness, or the like. In other conditions, for example, when the sensor is new and prepared for installation in turbocharger, or has been installed in a turbocharger in a manufacturing or remanufacturing setting, the preparing step at 402 may include locating a sensor connector plug and removing any protective caps to enable connection to the sensor plug or connector.

At 404, a mating connector of a tester tool is connected to the connector plug of the sensor to be tested, and the tester tool is activated to provide power to activate or operate the sensor at 406. Sensor operation is tested at 408 by causing the compressor wheel to rotate and simultaneously monitoring readouts on displays of the tester tool. For example, in one embodiment, the wheel may be rotated by spinning the compressor wheel, e.g., by hand, such that the user can see the frequency or rotational speed readout generated on appropriate displays of the tester tool change. The test is concluded at 410. Conclusion of the test may indicate that the sensor is functional, for example, if the frequency changes as the wheel is rotating at different speeds and the sensor is able to accept an operating voltage to operate. The test may fail if the contrary is true, and mitigation measures or adjustments can be made before repeating the test. For example, if the meter does not show any frequency response when the compressor wheel is spun, but the sensor is otherwise working, the user may check and adjust as necessary the gap between the speed sensor and compressor wheel blade. After checking and/or correcting the gap, the sensor can be diagnosed as faulty if the tester readouts do not indicate expected values as the wheel is again rotated.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A tester tool for a sensor, the tester tool comprising:
a housing;
a power supply disposed in the housing;
a control module disposed in the housing and operably associated with the power supply, wherein the control module uses electrical power stored in the power supply to operate;
a display module disposed in the housing, the display module arranged to receive information from the control module and to display information on at least one display readout that is disposed on the housing and is visible externally from the housing;
a connector plug adapted for releasable connection with a sensor connector plug, the connector plug being connected to the power supply for receiving power to operate the sensor, and to the control module for providing information to the control module from the sensor; and
an electrical switch operably disposed between the power supply and the connector plug;
wherein the at least one display readout is configured to provide information to a user indicative of operation of the sensor when the sensor is active and receives power to operate from the power supply.

2. The tester tool of claim 1, wherein the sensor is a compressor wheel speed sensor, and wherein the control module receives a square wave signal from the compressor wheel speed sensor as a compressor wheel of a turbocharger is rotating.

3. The tester tool of claim 1, wherein the information received by the display module from the control module includes a value indicative of a voltage provided from the power supply to the sensor, and a value indicative of a frequency of a waveform provided from the connector plug to the control module.

4. The tester tool of claim 1, wherein the connector plug is disposed remotely from the housing and is connected to the power supply and the control module by one or more electrical conductors extending between the connector plug and the housing.

5. The tester tool of claim 1, wherein the electrical switch is operably disposed between the power supply and the control module.

6. A method for testing sensor functionality for a sensor used to sense a speed of a compressor wheel and produce a signal indicative of a rotational speed of the compressor wheel, the compressor wheel being operational within a compressor of a turbocharger on an engine, the method comprising:
   preparing a sensor to be tested;
   connecting a sensor connector to a mating connector plug of a tester tool, wherein the tester tool comprises:
      a housing;
      a power supply disposed in the housing;
      a control module disposed in the housing and operably associated with the power supply, wherein the control module uses electrical power stored in the power supply to operate; and
      a display module disposed in the housing, the display module arranged to receive information from the control module and to display information on at least one display readout that is disposed on the housing and is visible externally from the housing;
      wherein the mating connector plug is adapted for releasable connection with the sensor connector, the sensor connector being connectable to the power supply for receiving power to operate the sensor through the mating connector plug, the sensor connector being further connectable to the control module for providing information to the control module from the sensor; and
      wherein the at least one display readout is configured to provide information to a user indicative of operation of the sensor when the sensor is active and receives power to operate from the power supply;
   wherein the method further includes:
   activating the tester tool to operate the sensor;
   testing sensor operation using the tester tool, wherein the sensor provides a square wave signal to the control module when the compressor wheel is rotating; and
   concluding a test of the sensor.

7. The method of claim 6, wherein the sensor is fastened onto a housing of the compressor.

8. The method of claim 6, wherein the display readout displays a voltage provided from the power supply to the sensor.

9. The method of claim 6, wherein the display readout displays a rotational speed of the compressor wheel.

10. The method of claim 6, wherein the mating connector plug is disposed remotely from the housing and is connected to the power supply and to the control module by one or more electrical conductors extending between the mating connector plug and the housing.

11. The method of claim 6, further comprising an electrical switch operably disposed between the power supply and the control module, the electrical switch operating to selectively activate the control module.

12. The method of claim 6, further comprising an electrical switch operably disposed between the power supply and the mating connector plug, the electrical switch operating to selectively provide power to activate the sensor.

13. A method for diagnosing a failure in a sensor for measuring a shaft speed of a turbocharger, the method comprising:
   providing the sensor installed into the turbocharger;
   connecting a sensor connector to a mating connector plug of a tester tool;
   activating the tester tool to operate the sensor;
   testing sensor operation using the tester tool, wherein the tester tool displays a rotational speed of a compressor wheel of the turbocharger; and
   concluding a test of the sensor.

14. The method of claim 13, wherein the tester tool comprises:
   a housing;
   a power supply disposed in the housing;
   a control module disposed in the housing and operably associated with the power supply, wherein the control module uses electrical power stored in the power supply to operate; and
   a display module disposed in the housing, the display module arranged to receive information from the control module and to display information on at least one display readout that is disposed on the housing and is visible externally from the housing;
   wherein the mating connector plug is adapted for releasable connection with the sensor connector, the sensor connector being connectable to the power supply for receiving power to operate the sensor through the mating connector plug, the sensor connector being further connectable to the control module for providing information to the control module from the sensor; and
   wherein the at least one display readout is configured to provide information to a user indicative of operation of the sensor when the sensor is active and receives power to operate from the power supply.

15. The method of claim 14, wherein the mating connector plug is disposed remotely from the housing and is connected to the power supply and to the control module by one or more electrical conductors extending between the mating connector plug and the housing.

16. The method of claim 14, further comprising an electrical switch operably disposed between the power supply and the control module, the electrical switch operating to selectively activate the control module and the sensor.

17. The method of claim 14, further comprising an electrical switch operably disposed between the power supply and the mating connector plug, the electrical switch operating to selectively provide power to activate the sensor.

18. The method of claim 13, wherein the tester tool displays a voltage provided from the tester tool to the sensor.

19. The method of claim 13, wherein the sensor provides a square wave signal to the tester tool when the compressor wheel is rotating.

20. The method of claim 19, wherein the tester tool determines the rotation speed based on the square wave signal provided from the sensor to the control module.

* * * * *